United States Patent
Brubaker et al.

[15] 3,673,290
[45] June 27, 1972

[54] FOAMED CLAY PROCESS
[72] Inventors: Burton D. Brubaker; Nathan Waldman, both of Midland, Mich.
[73] Assignee: The Dow Chemical Company, Midland, Mich.
[22] Filed: Nov. 26, 1969
[21] Appl. No.: 880,013

[52] U.S. Cl. ............................264/43, 106/40 R, 161/159, 264/42, 264/55, 264/66, 264/125
[51] Int. Cl. ......................................C04b 21/00, B28b 1/50
[58] Field of Search...............252/62, 378 R, 378 P; 264/42, 264/55, 121, 125, DIG. 21, DIG. 39, 43, 66; 106/40, 41, 72; 161/165, 192, 159

[56] References Cited

UNITED STATES PATENTS

| | | | |
|---|---|---|---|
| 3,056,184 | 10/1962 | Blaha | 264/42 X |
| 1,877,138 | 9/1932 | Lee et al. | 106/40 R |
| 2,676,892 | 4/1954 | McLaughlin | 106/40 R X |
| 2,706,844 | 4/1955 | Nicholson | 106/40 R X |
| 3,418,403 | 12/1968 | Garnero | 252/378 R X |
| 3,515,624 | 6/1970 | Garnero | 252/378 R X |
| 2,271,845 | 2/1942 | Parsons | 106/40 R |
| 3,274,309 | 9/1966 | Schreieck | 264/42 |

Primary Examiner—Robert F. Burnett
Assistant Examiner—Joseph C. Gil
Attorney—Griswold & Burdick, William R. Norris and Lloyd S. Jowanovitz

[57] ABSTRACT

Disclosed is a foamed ceramic material having a relatively small and uniform cell structure. The material is suitable for structural or insulating purposes. A continuous process for producing the foamed ceramic material comprises dropping a bloatable ceramic composition, in particulate form, through a heated zone thereby fusing and bloating the particles, and subsequently collecting the fused particles. To produce the desired cellular structure, the process does not fully bloat the particles during dropping, thereby delaying part of the bloating of the particles until after they have been collected as an agglomerated slab.

9 Claims, 3 Drawing Figures

PATENTED JUN 27 1972 3,673,290

INVENTORS.
Burton D. Brubaker
Nathan Waldman
BY Griswold & Burdick
ATTORNEYS 3,673,290

FOAMED CLAY PROCESS

BACKGROUND OF THE INVENTION

A number of different processes have been devised whereby particles of a bloatable composition (such as glass batches, and natural or synthetic clays) are treated in a heated zone to produce useful articles. To illustrate, Christensen et al., (U.S. Pat. No. 2,151,083) dropped particles of a clay composition through a heated zone to partially bloat the particles into multicellular bodies. The bloated particles were subsequently chilled and collected to produce lightweight aggregate. McLaughlin (U.S. Pat. No. 2,676,892) varied the process of Christensen by heating the particles to a higher degree before collection. The resulting product was lightweight aggregate in the form of hollow unicellular bodies. A more recent process (similar to McLaughlin) for making bloated aggregate is described by P. Weber et al., (U.S. Pat. No. 3,409,450).

It has long been known that processes similar to McLaughlin or Christensen could be employed to make agglomerated products from clays. For example, Parsons (U.S. Pat. No. 2,271,845) dropped particles of clay through a zone heated sufficiently to melt only the surfaces of the particles. The particles were collected before cooling to form an agglomerated material.

The density and heat conductivity of agglomerated products such as those of Parsons can be reduced by bloating the clay particles with further heating after agglomeration. Further heating, however, raises problems because the particles on the surface of the agglomerate tend to bloat first and form an insulating layer, which decreases the amount of heat reaching the interior of the agglomerate. The result is an agglomerated material of varying cross-sectional density and cell size.

Lee (U.S. Pat. No. 1,877,137) solved the insulating problem by forming the agglomerate in a series of layers so that interior portions were on the "surface" of the agglomerate sufficiently long to be adequately bloated before they were covered with successive layers of particles. To achieve this result, Lee employed a plurality of horizontally-disposed dropping zones to apply particles to a surface moving under the zones. Slidell et al., (U.S. Reissue Pat. No. 18,844) replaced the multiple dropping zones and continuously moving surface of Lee with a reciprocally moving inclined plane.

Subsequently, it was discovered by Blaha (U.S. Pat. No. 3,056,184) that an agglomerate of uniform density could be prepared on a continuous basis (as opposed to a batch-type basis) by bloating particles into individual hollow spheres of unicellular or multicellular form during their passage downward through the heated dropping zone. The bloated particles, as collected below the dropping zone, are sufficiently hot so that they coalesce during collection without application of further heat to form a lightweight, agglomerated structure, which possesses large cells and a density of at least 18 pounds per cubic foot (p.c.f.)

Agglomerated products similar to the Blaha product can also be produced by mold-bloating techniques. For example, Nicholson (U.S. Pat. No. 2,706,844) using mold-bloating techniques, produced an agglomerate having a density as low as 20 p.c.f. Kitaigorodskii et al., (Trudy Moskov. Khim.-Tekh. Inst. im. D. I. Mendeleeva Pat. No. 24, 318,323 (1957) describes mold-bloating experiments wherein agglomerates with a density of 12.5 p.c.f. were produced.

A principal object of the invention is to provide a novel continuous pellet-dropping process for producing foamed ceramic materials.

It is an object of the present invention to provide novel agglomerated foamed ceramic materials having a uniform density of less than 12 p.c.f. and small (e.g., 2 mm) cells which are generally uniformly distributed throughout the product.

It is another object of the invention to provide a foamed ceramic material having low thermal conductivity.

Still another object of the invention is to provide a novel foamed ceramic material having a density of less than about 10 p.c.f. and as low as 6 p.c.f.

SUMMARY OF THE INVENTION

Figures 1, 2, 3:
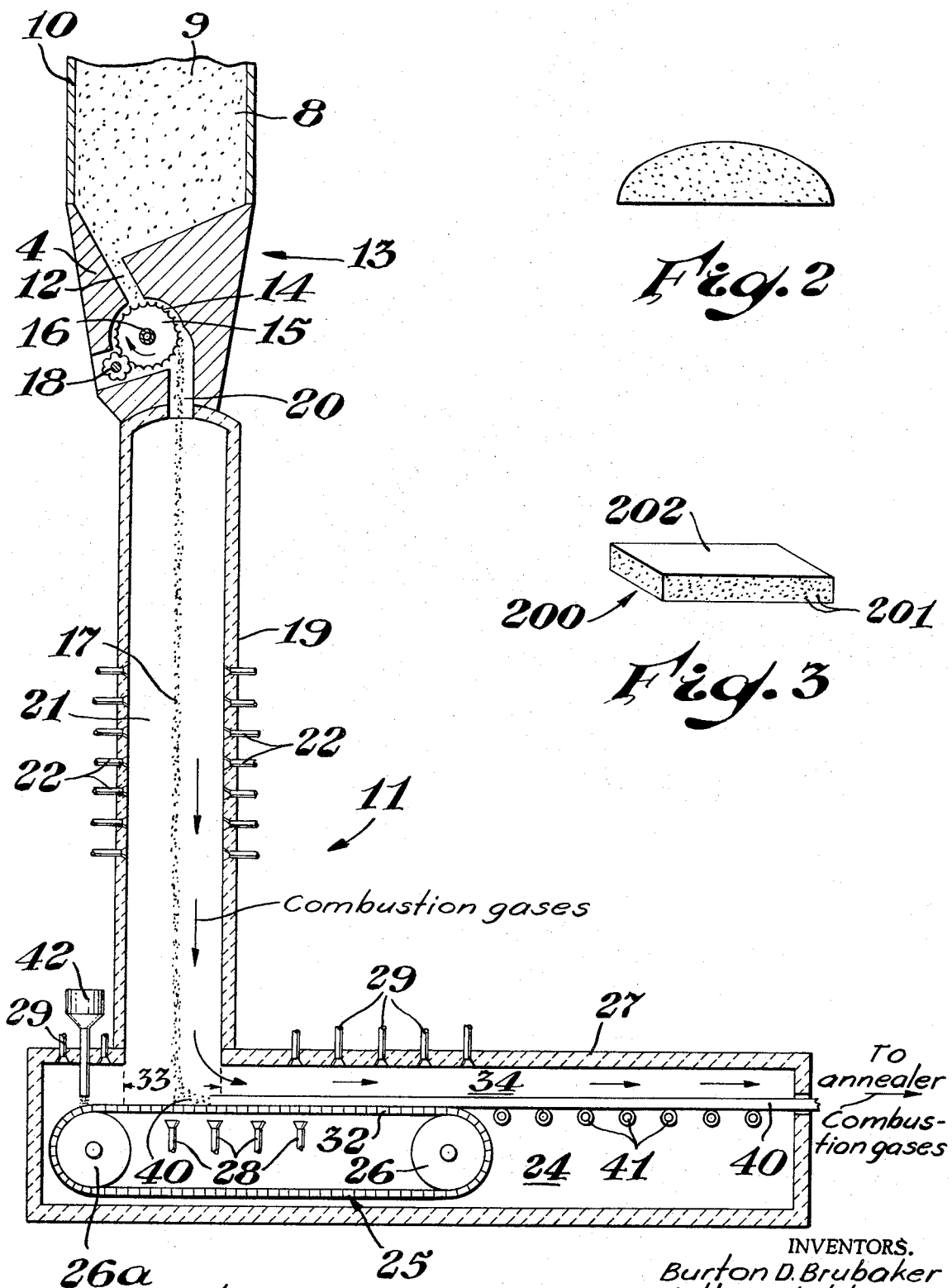
FIG. 1 is a schematic cross-sectional view of a furnace which can be employed in producing the foamed ceramic material of the present invention.
FIG. 2 is a cross-sectional view of a foamed ceramic product before machining.
FIG. 3 is a cross-sectional view of the ceramic product after machining.

In the present invention, individual particles of a bloatable ceramic composition are passed downwardly through a heated dropping zone. The zone temperature is in excess of the initial melting temperature of the composition and is sufficient to bloat the particles to the point where each particle contains a plurality of hollow cells. The bloated particles are collected below the dropping zone in a heated collection zone. The temperature of the heated collection zone and time of residence of the particles therein are sufficient to cause the collected particles to further bloat and coalesce to form a foamed ceramic slab wherein individual bloated particles are not visually distinguishable. The slab is subsequently cooled in a controlled manner (i.e., annealed) to minimize the effect of thermal stresses which arise during cooling.

It is important in carrying out the invention that during the passage downward through the heated zone, the particles are not bloated to full capacity, i.e., the particles should be bloated only to from about 50 to about 90 percent of capacity. The maximum bloating capacity (minimum density) of the particles is determined by a series of runs in which aliquots of the foamable ceramic are dropped through the heated zone at incrementally increased temperatures. A plot of the bulk densities (as ordinate) of the resulting bloated ceramic particles against temperatures (as abscissa) yields a cup-shaped curve, the minimum of which defines the particle density at maximum bloating capacity. Particles bloated within the above range will retain a vestige of their original shape. For example, substantially all of the particles will be non-spherical in shape, assuming that the particles were produced by extrusion or "-slinging" and were therefore non-spherical before they were dropped. A slinging process and apparatus is described in U.S. Pat. No. 3,259,171, which is incorporated herein by reference as one means suitable for the preparation of particles.

It has been found that if the particles have fused and bloated to hollow essentially unicellular spheres, the point of minimum density will have been passed and the particle density will have started to increase above the minimum point. Thus, further expansion after agglomeration is unlikely. By not utilizing the full bloating capacity of the particles during dropping as in the practice of the instant invention, the particles can be bloated further after they are collected. The gases which normally escape as the particles are bloated to maximum potential are trapped within the mass of collected particles to produce the desired low density foams.

During the collection in the heated collection zone, the particles are simultaneously bloated "further" and are coalesced to form the ceramic foam product of the invention. Where simultaneous "further" bloating and coalescence occurs in the collection zone, the zone is heated to a temperature from about 75° C. to about 200° C. below the temperature of the dropping zone.

Heating of the collection zone can be accomplished by positioning burners in close proximity to the zone, or by passing the heated combustion gases from the dropping zone through the collection zone. Preferably, both means of heating will be employed for control purposes. For efficient heating and temperature control in the collection zone, it is desirable that the zone be essentially isolated from the atmosphere outside the furnace, and from other portions of the furnace excepting the continuous dropping zone.

In the above description of the invention, the functions of the collection zone have been to complete bloating of the partially bloated particles received from the dropping zone, and to cause coalescence of the particles. Presently, this is the preferred method for carrying out the invention. It should be understood, however, that the collection functions (i.e., further bloating and coalescence) need not be conducted simultaneously but could in fact be shared between a number of zones. To illustrate, partially bloated particles were collected in a heated zone wherein they adhered together and were further bloated to form an initial slab of ceramic material. Some coalescence of the particles also occurred in the collection zone. Subsequently, the slab was passed into a third heated zone (the heated dropping and collection zones being the first two heated zones), where bloating and coalescence of the particles were completed.

After coalescence has occurred, the slab is cooled as further exposure to the high temperatures of the collection zone may cause an undesirable increase in cell size.

For purposes of the present application, the term "melting" indicates a heat-produced condition of particles of bloatable composition whereby the interior and surface portions of particles become thermally plastic and capable of deformation without fracture by internally generated gas pressure. The mineralogical or physical components (e.g., glass-clay mixtures, pure clay minerals, mixtures of clay minerals, etc.) of the ceramic composition become at least partially chemically blended. "Coalescence" or "coalesce" indicates that collected particles unite or merge into a single viscous body capable of trapping gases released from the particles. During coalescence, the individual particles lose their identity so that, on visual observation of a cross-sectional area of the foamed ceramic material formed from the coalesced particles, a large number of small substantially uniform cells is seen. Very few, if any, vestiges of individual particles would be seen.

Because melting can take place very sharply, that is essentially at a constant temperature, as for many pure crystalline chemical compounds or eutectic compositions, and also over widely variable temperature ranges, as for a complex mixture or the softening of glass, it is necessary to discuss the determination and definition of the "initial melting temperature" of the bloatable ceramic compositions. In determining initial melting temperature, the ceramic composition is thoroughly mixed and ground by ball milling to pass a 200 mesh sieve. The powder is tamped lightly into a sample holder for differential thermal analysis (DTA). A DTA test is run using a heating rate of about 20° C. per minute. The DTA test is carried out in a gaseous atmosphere of helium flowing at a rate of 0.4 liter per minute. The DTA apparatus employed is a DTA Module, Model Number DTA-A1, manufactured by the Harrop Precision Furnace Company. The sample holder, consisting essentially of nickel processed the same dimensions as the standard beryllium oxide holder, supplied with Model Number DTA-A1. The reference material was ignited alumina. The thermocouples were a platinum versus platinum-10-percent rhodium.

Melting is an endothermic reaction and will be recorded as an endothermic peak on the DTA record. The first DTA test is run to at least 1,000° C. and until a "strong" endothermic reaction has begun. A strong endothermic reaction is one which gives a recorder peak of at least one-fifth full scale deflection from the base line on a DTA instrument calibrated so that a reagent grade precipitated calcium carbonate (e.g., calcite) gives a decomposition peak maximum of at least four-fifths full scale.

Where a "strong" endothermic reaction is observed, heating is stopped and the sample is cooled. Whether the endothermal peak is due to the onset of melting is determined by physical examination. If melting has begun, visual observation with a light microscope or a scanning election microscope will reveal some bonding together of the particles of powder and occasional fracturing of particles which have bonded. Also, the presence of small spheres in the sample and "rounding" of the particles will be observed, especially along surfaces created by fracturing the sample, as in removing it from the DTA "cup." The physical integrity of the sample will progress from a point where before heating began it was easily pulverized between the fingers, until after initial melting has begun, when pulverization with the fingers is difficult and incomplete, i.e., the sample has become "hard" and agglomerated. If melting has been sufficient to allow bloating and expansion, the sample will probably have to be chipped out of the sample holder, and the initial melting temperature obviously has been exceeded.

Where the above procedure is followed, a subsequent DTA test can be run to a termination point of 10°–20° C. below the temperature at which the endothermic peak under investigation began. The sample, when cooled, should be either a loose powder or slightly compacted, but still easily reducible to a powder by rubbing between the fingers. None of the rounding of particles, or bonding of particles and fracture of particles should be observable with a microscope.

The "initial melting point" is defined as the temperature at the beginning of the "strong" endothermic peak (on a DTA curve) which has been identified as "melting" by the visual observation techniques described above.

The invention can be better understood by reference to FIG. 1. The furnace (indicated by reference numeral 11) consists of a pellet distribution device (indicated by reference numeral 13) consisting of a pellet storage bin casing 10, which defines a storage chamber 8 containing pellets 9 of a bloatable ceramic composition. Casing 10 rests upon feeder housing 4 which defines a passageway 12 extending from storage chamber 8 to chamber 14 wherein a horizontal grooved drum 15 is rotatably mounted on hollow shaft 16. The grooved drum is in meshing engagement with cleaning wheel 18. The feeder housing 4 defines a conduit 20 leading to a dropping zone 21. Conduit 20 connects the pellet distribution device with the dropping zone 21.

In the walls of the vertical dropping zone, housing 19 defining dropping zone 21 are housed a plurality of recuperative burners 22. The burners are supplied with a combustible mixture of gas and air. Heat is directed toward the center of the furnace.

The dropping zone housing 19 discharges heated particles and heated combustion products into collection and cooling zone housing 27. This housing defines a cavity 24 wherein a pellet collection apparatus (indicated generally by reference numeral 25) is mounted. The pellet collection apparatus 25 consists rotatably mounted cylinders 26 and 26a which support a product collection belt 32. Positioned above the belt 32 are burners 29. Positioned below the belt are burners 28. The portion of cavity 24 immediately below the dropping zone 21 is collection zone 33 wherein pellets 17 are collected to form a slab of foamed ceramic material 40. The slab is transported by belt 32 through a controlled cooling zone 34 adapted with burners to allow for gradual cooling at high temperatures. From the cooling zone 34, the foamed ceramic may be further processed in an annealer which provides for gradual temperature reductions to minimize internal stresses (not shown). A plurality of product removing rollers 41 are mounted in the controlled cooling zone 34. Apparatus 42 for distributing parting agent onto the belt 32 is positioned at the end of cavity 24 opposite the annealer.

To practice the invention, pellets 9 of a bloatable ceramic composition are placed in chamber 8 and pass through conduit 12 to contact grooved drum 14. As drum 14 is rotated, the particles thereon are dislodged by the force of gravity and pass downwardly through conduit 20 and dropping zone 21. Any particles not dislodged from drum 14 by gravity are crushed by wheel 18 and are thereby removed from drum 14.

Dropping zone 21 is heated by burners 22. Due to the essentially closed nature of the furnace, hot products of combustion pass downwardly through the dropping zone to the collection zone. In passing downwardly through the furnace chamber, the combustion products create a gas current which causes the ceramic particles to fall at a rate slightly faster than that produced by gravitational forces alone. As the particles 17 pass through the dropping zone, they are bloated until each particle contains a plurality of hollow cells as hereinbefore prescribed. By the time the pellets have reached the collection zone 33, they will have obtained a temperature within the range of from about 800° C. to about 1,700° C. The multicellular particles are collected in zone 33 on belt 32. As the belt turns, it is coated with a parting agent such as sand or expanded clay. The parting agent prevents the fused ceramic from reacting with, or adhering to, the collection belt. It also serves to insulate the belt from the high temperatures of the collection zone thereby giving the belt longer life and allowing for the use of higher temperatures in the collection zone than could normally be employed. The parting agent generally is (but need not be) sufficiently refractory so as not to be self-bonding at the temperature of the collection zone.

As the particles are collected, they bloat further and coalesce to form a slab 40 of foamed ceramic material which is passed through the cooling zone 34 and conveyed on rollers 41 to the annealer (not shown). Bloating and coalescence are substantially accomplished in the collection zone.

The purpose of cooling zone 34 is to cool the slab in a controlled manner so as to prevent fracturing of the slab by creating too large a temperature gradient between the interior and exterior portions of the slab. Further purposes of zone 34 are to cool the slab to a sufficiently rigid condition that only periodic support e.g., driven stainless steel rolls, need be provided for transport of the slab, and to cool the slab to a point where it will no longer require a parting agent for separation from other solid surfaces.

Before the slab leaves the collecting belt, it is cooled to a surface temperature of not less than 25° C. below the initial melting temperature of the composition. This cooling generally takes place over a period of from about 10 to about 60 minutes and is generally dependent upon the thickness of the slab.

The temperature of the foamed ceramic slab as it exits from the collection zone into the controlled cooling zone is from about 800° C. to about 1800° C. In the controlled cooling zone, the slab is cooled to from about 700° C. to about 1,200° C. over a period of from about 15 to about 60 minutes. The subsequent annealing process comprises cooling the material to a temperature of about 200° to about 500° C. over a period of from about 2 to 8 hours. Below about 200° C. the ceramic slab is machined to the desired size and shape by the use of tools suitable for cutting ordinary masonry.

Before machining, the ceramic slab has a cross-sectional area resembling FIG. 2. The slab is machined to provide a rectangular cross-sectional area. With reference to FIG. 3, the machined slab (200) is essentially planar in shape with a first major side (202) and a second major side (not shown) which is substantially parallel with the first major side. From FIG. 3, it can be seen that the slab contains a plurality of cells 201 which are generally uniformly distributed throughout the slab. At least about 90 percent of the cells are less than 2 mm. in size. While the thickness of the slab (i.e., the distance between the first and second major sides) varies with belt speed, rate of feed, bloatability of the composition, and other factors, the slab thickness with frequently be about 9 inches or less.

The ceramic materials of the present invention are employed for structural or insulating purposes after machining. For specific uses, the ceramic material can also be reinforced with rods, or various surface coatings can be applied, as where the material is to be used for decorative purposes.

Suitable bloatable ceramic compositions comprise at least 45 percent silica ($SiO_2$) and not more than about 18 percent of fluxing oxides. Suitable fluxing oxides are, for example, FeO, CaO, MgO, $Na_2O$, and $K_2O$. The material should also contain from about 0.05 to 2.0 weight percent of an organic carbon source material wherein the carbon is not present as carbonate. Suitable sources of organic carbon are, for example, organic carbon naturally present in clays, rice hulls, lampblack, coal, charcoal, oil shale and flour. In determining the amount of organic carbon present in the bloatable ceramic composition, the weight of oxygen, hydrogen, sulfur and other elements in the carbonaceous material are not considered, i.e., organic carbon is simply the weight of organically combined carbon present. The organic carbon content of a ceramic composition is equivalent to the difference between total carbon and inorganic carbon (i.e., carbon in carbonates). The method employed for determining total carbon is described by R. C. Rittner and R. Culmo, "A Rapid Multiple Microdetermination of Carbon and Hydrogen" Microchemica Acta, pages 631–640 (1964). The method for determining inorganic carbon is a determination of carbon present as carbonate. The method employed is that described by Hillebrand et al., at pages 768–770 of Applied Inorganic Analysis, 2nd Edition, published by John Wiley and Sons, Inc., of New York.

Generally, the initial melting temperature of particles of the bloatable ceramic composition is from about 925° to 1500° C., although materials with initial melting temperatures above 1,500° C. such as kaolin clay are suitable if equipment withstanding such temperatures is available.

It has been found that the above-described requirements of fluxing oxides and silica are satisfied by argillaceous materials containing not less than 50 weight percent of clay minerals such as kaolinite, dickite, halloysite, illite, attapulgite and montmorillonite. Mixtures of clay minerals can also be employed. Other materials which can be employed in combination with the clay minerals include calcareous oil shale, dolomite, limestone, talc, feldspar, wollastonite, nepheline syenite and similar minerals. All such materials must be in a finely divided state, preferably 100 percent minus 200 mesh, with 90 percent minus 325 mesh, or finer.

In preparing the particles to be dropped, if more than one ingredient is required, the selected ingredients are intimately admixed to a uniform composition. The composition is moistened sufficiently so that it assumes the consistency of a plastic mass which is then molded to provide particles having a maximum dimension within the range of one thirty-second to one-fourth inch. For example, the plastic mass can be molded into suitably shaped particles by extruding it through a grating to form strands. The strands are dried and broken into small particles of an approximately uniform size such as one-sixteenth to one-eighth inch long and about one thirty-second inch in diameter. The resulting particles are then thoroughly dried at a temperature of about 200° C. or slightly less, to remove substantially all water except chemically combined water. Suitable methods of forming particulate material are described in U. S. Patents Nos. 3,259,171; 3,202,746 and 3,071,357. The bulk density of the dried particles will generally be from about 0.9 to 1.1 gms/cm.$^3$, with the exact bulk density depending upon the composition of the particles.

Where the iron content of the composition (expressed as $Fe_2O_3$) is in excess of about 4 percent by weight, it is necessary that the atmosphere in the furnace chamber be a "reducing" atmosphere, i.e., during dropping and collection of the particles the atmosphere in the furnace chamber must be essentially oxygen-free to prevent oxidation of ferrous iron values to ferric oxide. The basic problem arises during the collection and coalescence of the foam in the collection zone because the oxidation takes place progressively from the surface and since the ferric iron is a poorer flux than the ferrous iron, the oxidized outer layers are more refractory and will not coalesce at the same temperature as the interior which tends to have the iron in the ferrous state. Thus, control of the collection and coalescence steps are lost if a reducing or at least non-oxidizing atmosphere is not maintained. In the practice of the invention, the desired "reducing" conditions are maintained if the atmosphere of the furnace chamber is essentially isolated from the outside atmosphere, and if, in addition, the fuel gas mixture fed to burners 22, 29, and 28 contains less than stoichiometric amount of oxygen required to completely react with the fuel. For example, if the fuel is $CH_4$, the fuel gas mixture should consist volumetrically of not more than 91 percent air, with the balance being the fuel gas.

Within the limits of the process as described above, the density of the foamed ceramic material can be controlled by varying the amount of organic carbon in the bloatable ceramic composition. For example, for a foamed ceramic density of less than about 12 p.c.f., the organic carbon content should be from about 0.50 to about 2.0 weight percent of the composition. For foamed ceramic densities of from 12 to 30 p.c.f., the organic carbon content is from about 0.20 to about 0.50 weight per cent. For densities in excess of about 30 p.c.f., the organic carbon content is less than about 0.20 weight percent.

The foamed ceramic product of the present invention is a rigid vitreous structural element, also possessing excellent properties as an insulating material. The product is resistant to acidic and basic media and is water insoluble. The ceramic product comprises a plurality of closed individual, non-communicating hollow cells which are uniformly disposed throughout the product.

The ceramic foam material has a cross-sectionally uniform density. For materials with a density of from 6 to 12 p.c.f., thermal conductivity is from about 0.36 to about 0.70 BTU/ft$^2$/° F./hour/inch (75° F. mean temperature). At temperatures for the ceramic material of from about 0° C. to about 950° C., specific heat is from about 0.15 to about 0.30 BTU/pound. Moisture absorption is from about 0.1 to about 0.5 percent by volume. The ceramic material (of 6 to 12 p.c.f. density) may be further characterized as having a water vapor transmission of from about 0.0 to 0.5 perm-inch.

In characterizing the foam ceramic product, thermal conductivity is determined by employing ASTM test C–177–63 as modified by C–240–61. Water absorption is determined by ASTM test C–272–53 as modified by C–240–61. Water vapor transmission is determined by ASTM test C–355–64. Within the temperature range of from 0° C. to 500° C., specific heats are determined by differential scanning calorimetry using a Perkin-Elmer, Model DSC–1B differential scanning calorimeter. At temperatures of from 500° C. to 950° C., specific heats are determined by drop calorimetry. This technique is described in the 1968 edition of McCullock and Scott, Experimental Thermodynamics, Volume 1, Chapter 8.

The foamed ceramic products of the invention can be produced in a variety of colors. For example, where the bloatable raw material employed contains ferrous or ferric iron, and the foam is produced in a reducing atmosphere (as described above), the foamed ceramic product will be black or gray. A reddish color can be obtained by exposing the ceramic product to an oxidizing atmosphere while the temperature of the foam is in excess of about 750° C. Such exposure causes formation of ferric oxide on the surface of the foam. If desired, a white ceramic foam can be produced by employing, as the raw material, a kaolin clay which is essentially free of color forming impurities such as the oxides of iron, chromium, cobalt, vanadium, and nickel.

Preferred Embodiment

A preferred embodiment of the invention is the process whereby foamed ceramic materials having a density of less than about 10 p.c.f. are obtained. These low density products are also characterized as having substantially uniformly sized cells with an average diameter of less than about 2 mm. Generally, the average diameter is less than about 1 mm.

It has been discovered that, using a continuous dropping process as described above, only ceramic compositions wherein the particles have a maximum bloating capacity of less than about 25 p.c.f. will produce foamed ceramic material having a density of less than about 12 p.c.f. In the preferred embodiment of the invention, it is necessary that the particles have a maximum bloating capacity of less than 20 p.c.f. if foamed ceramic materials of about 10 p.c.f. or less are to be produced.

The propensity of a ceramic composition to bloat to a density of less than 25 p.c.f., or less than 20 p.c.f., is determined by fabricating particles of the composition, as described above, and passing these particles downwardly through a heated zone so that substantially all the particles are bloated. The bloated particles are than cooled before collection so that they will not adhere to each other during collection. A sample of the bloated particles is then obtained.

The bulk density of the sample of bloated particles is determined by placing the sample of bloated particles in a 25 milliliter graduate cylinder. The cylinder is dropped, base down, a distance of about one inch onto a wooden table top. The cylinder is dropped twenty times. The volume of the particles is then noted and the weight of the particles is obtained. The bulk density of the particles is the weight in grams divided by the volume in cubic centimeters. Multiplying the above quotient by 62.4 will yield the bulk density in pounds per cubic foot. The bulk density of dried non-bloated particles which have not been dropped through a heated zone is also determined by the method just described.

In producing low density foamed ceramics other factors, in addition to proper choice of the bloatable ceramic composition, are to be controlled. The temperature in the dropping zone should be regulated so that immediately before collection, the ratio of the bulk density of the bloated particles to the bulk, density of the particles before dropping and bloating will fall within the range of from about 0.20 to about 0.75. Preferably, the bulk density ratio will be from about 0.30 to about 0.50. Where bulk density ratios within the above ranges are employed, the particles have generally bloated to from about 50 to 90 percent of their capacity, e.g., if the density of the particles before bloating is from about 55 to about 70 p.c.f., the density of the particles as collected will be from about 15 to about 50 p.c.f. The temperature of the collection zone and time of residence of the agglomerated ceramic material therein is regulated so that the particles bloat to their maximum capacity and coalesce. Once coalescence has occurred, the ceramic material should be removed from the collection zone into a controlled cooling or annealing zone as further heating in the collection zone may result in enlargement of the cells and undesirable increases in density.

Particularly suitable ceramic compositions are those having the above-described bloating propensities, and having, in addition thereto, an initial melting temperature, as previously defined, of from about 925° C. to about 1,500° C. When such compositions are employed, the temperature in the dropping zone is from about 175° C. to about 400° C. above the initial melting temperature of the composition. The collection zone temperature is from about 50° C. to about 250° C. above the initial melting temperature of the composition. When the above temperature ranges are employed, the height of the dropping zone is generally from about 15 to about 25 feet, and the diameter of extended pellets ranges from about 0.010 inch to about 0.050 inch with the pellet length/diameter ratio being from 1 to 10. The time of residence in the collection zone is from about 0.75 to about 5 minutes.

Preferably the temperature in the dropping zone is from about 200° C. to about 305° C. above the initial melting temperature of the composition, and the collection zone temperature is from about 125° C. to about 225° C. above the initial melting temperature of the composition.

The ceramic material produced in the preferred embodiment of the invention (described above) has a density of from about 6 to about 10 p.c.f. Most frequently the ceramic material is produced in densities of from about 6.8 to about 9 p.c.f. The material has a thermal conductivity of from about 0.36 to about 0.60 BTU/ft$^2$/° F./hour/inch, a specific heat of from about 0.15 to about 0.30 BTU/pound (as measured over a temperature range of from 0° C. to 950° C.), and a moisture absorption of from about 0.1 to about 0.5 percent by volume. The average cross-sectional diameter of the cells is less than 2.0 mm. Compressive strength of the material is from about 20 to about 300 pounds per square inch, and flexure strength is from 40 to 200 pounds per inch squared (as determined by 3 point loading).

The following example is set forth to illustrate a preferred embodiment of the invention.

Example of the Invention

Suitable clay was obtained. The clay (as mined) was blue-gray in color and was of the general type of clays denominated as Minford silts, as described in the Bulletin of the Geological Society of America, Volume 42, pages 663–672, September, 1931.

Chemical analysis of the clay expressed as the oxides is as follows:

| Element | Weight Percent |
| --- | --- |
| $SiO_2$ | 51.0 |
| $Al_2O_3$ | 22.7 |
| $Fe_2O_3$ | 2.73 |
| $FeO$ | 4.0 |
| $MgO$ | 2.58 |
| $CaO$ | 1.79 |
| $TiO_2$ | 0.68 |
| $P_2O_5$ | 0.11 |
| $K_2O$ | 4.73 |
| $Na_2O$ | 0.18 |
| $MnO$ | 0.06 |
| carbonate carbon | 0.44 |
| sulfide sulfur | 0.14 |
| sulfate sulfur | 0.03 |
| loss on ignition at 900° C. | 7.41 |

The clay contained about 0.57 weight per cent of organic carbon. Therefore, addition of organic carbon to the clay was not necessary.

As mined, the clay contained about 40 percent by wt water on a dry basis. The clay was extruded through a 0.020 inch grating and the resulting strands were dried. The dried strands were broken to yield small particles with an approximately uniform size of from 0.020 to 0.20 inch in length and about 0.020 inch in diameter. The particles were then dried at about 200° C. to remove all water except chemically combined water. The amount of chemically combined water in the pellets was about 5.4 percent by weight. The bulk density of the pellets, as determined by the method described above, was about 59 p.c.f.

The initial melting temperature of the pellets was about 1,020° C.

The dried pellets were placed in a hopper at the top of a furnace similar to that depicted in FIG. 1. The particles exited from the hopper onto a grooved drum. The particles were subsequently dislodged from the grooves of the drum by the force of gravity and passed through the furnace chamber and were collected on a conveyor belt previously coated with parting agent. In the furnace chamber, the distance from the bottom of the drum to the collection belt was about 23 feet. The falling time for the particles was about 0.8 second. About 2 feet directly below the bottom-most portion of the drum, the temperature in the furnace chamber was about 1,260° C. The temperature of the surface of the foam measured optically in the collection zone was 1,190° – 1,215° C.

The fuel mixture fed to the burners consisted of about 90 percent by volume of air with the balance being methane. As in FIG. 1, the furnace chamber and collection zone were essentially closed to the atmosphere.

As the particles passed downwardly through the furnace, samples were obtained (from a point immediately above the collection zone) by inserting an air cooled stainless steel collection cup into the furnace. As collected, the particles were partially bloated and had a bulk density of about 21.5 p.c.f. The ratio of the bulk density of collected particles to the bulk density of bloatable ceramic particles in the hopper was about 0.36.

After passing the dropping zone, the partially bloated particles were collected in a mass on a conveyor belt to form a slab of cellular agglomerated material. The speed of the belt was about 4 inches/minute. The temperature in the region immediately above the belt where the particles were collected was about 1,210° C. The slab had an average thickness of about 5 inches. The average residence time of particles (and ceramic material produced therefrom) in the collection zone was about 120 seconds.

As the slab passed into the controlled cooling zone, the surface temperature of the slab (as measured by optical pyrometer) was about 1,200° C. The slab remained in the controlled cooling zone for about 50 minutes. At a temperature of about 815° C., the slab was machined (by cutting), into 8 foot sections by a rotary saw. As the slab passed from the cooling zone into the annealer, the slab surface temperature was about 800° C.

In the annealer, the slab was cooled to a temperature of about 250° C., over a period of about 5 hours. After removal from the annealer the sides, top and bottom of the slab were also machined so that the slab had a rectangular cross-sectional area measuring about 4 inches by 16 inches.

The cell size of the resulting foamed ceramic material had an average cross-sectional diameter per cell less than 2 mm. The cells were closed or non-communicating so that air or water could not penetrate through the slab.

Slab density was about 7.0 to 8.0 pounds per foot$^3$, and flexure strength was from 65 to 75 pounds per inch$^2$. Thermal conductivity was about 0.37 to 0.40 BTU/Ft$^2$/° F./Hr./in. Specific heat was about 0.175 British thermal units per pound at 25° C.; tensile strength was about 35 psi; and moisture absorption was about 0.5 per cent by volume. The material was resistant to both acidic and basic media, i.e., degradation did not occur upon contact with these media.

What is claimed is:

1. A process for preparing an agglomerated foamed ceramic material having a uniform density of about 12 pounds per cubic foot or less comprising:
   a. passing particles of a bloatable ceramic composition downwardly through a heated dropping zone wherein the temperature is in excess of the initial melting temperature of the composition and is sufficient to bloat the particles to within about 50 to about 90 percent of the maximum bloating capacity of the particles, by the time they reach the bottom of the dropping zone to produce in each particle a plurality of hollow cells,
   b. collecting the bloated particles below the dropping zone in a collection zone thereby to form an initial agglomerate of a partially foamed ceramic material,
   c. heating said initial agglomerate at a temperature for a time sufficient to further bloat and coalesce the particles to form a foamed ceramic slab, and
   d. cooling the foamed ceramic slab.

2. A process as in claim 1 wherein the bloatable ceramic composition comprises at least about 3 weight percent of iron expressed as $Fe_2O_3$ and wherein the atmosphere in the heating zones through which the bloatable ceramic particles and agglomerated cellular material are passed is a reducing atmosphere.

3. A process as in claim 1 wherein the bloatable ceramic composition has a maximum bloating capacity of less than 25 p.c.f. and wherein the temperature in the dropping zone is regulated so that the ratio of the bulk density of bloated particles immediately before collection thereof, to the bulk density of particles before dropping is from about 0.20 to about 0.75.

4. The process of claim 3 wherein the bulk density ratio is from about 0.30 to about 0.50.

5. A process as in claim 3 wherein the temperature of the dropping zone is from about 175° C. to about 400° C. above the initial melting temperature of the composition, and wherein the temperature of the collection zone is from about 50° C. to about 250° C. above the initial melting temperature of the bloatable ceramic composition.

6. A process as in claim 5 wherein the temperature of the dropping zone is from about 200° C. to about 305° C. above the initial melting temperature of the composition, and wherein the temperature of the collection zone is from about 125° C. to about 225° C. above the initial melting temperature of the bloatable ceramic composition with the time of residence of the collected particles and foamed ceramic slab in the collection zone being about 0.5 to 5.0 minutes.

7. A process as in claim 6 wherein the initial melting temperature of the bloatable ceramic composition is about 1,020° C., the dropping zone temperature is about 1,260° C., with the falling time for particles being about 0.80 second, and wherein the collection zone temperature is about 1,165° C.

8. A process for preparing an agglomerated foamed ceramic material having a uniform density of about 12 pounds per cubic foot or less comprising:
   a. dropping particles of a bloatable ceramic composition containing from about 0.50 to about 2.0 percent by weight of organic carbon and having a maximum bloating capacity of less than about 25 p.c.f. downwardly through a heated dropping zone wherein the temperature is sufficiently in excess of the initial melting temperature of the composition to bloat the particles sufficiently to provide a ratio of the bulk density of the bloated particles immediately before collection thereof to the bulk density of the particles before dropping from about 0.20 to about 0.75,
   b. agglomerating the bloated particles below the dropping zone in a heated collection zone to form an initial agglomerate of a partially foamed ceramic material,
   c. heating said initial agglomerate at a temperature above the initial melting temperature and below the temperature of the dropping zone for a time sufficient to further bloat and coalesce the particles to form a foamed ceramic agglomerate, and
   d. cooling the foamed ceramic agglomerate.

9. A process for preparing an agglomerated foamed ceramic material having a uniform density of about 10 pounds per cubic foot or less comprising:
   a. dropping particles of a bloatable ceramic composition containing from about 0.50 to about 2.0 per cent by weight of organic carbon and having a maximum bloating capacity of less than about 20 p.c.f. downwardly through a heated dropping zone wherein the temperature is sufficiently in excess of the initial melting temperature of the composition to bloat the particles sufficiently to provide a ratio of the bulk density of the bloated particles immediately before collection thereof to the bulk density of the particles before dropping from about 0.30 to about 0.50,
   b. agglomerating the bloated particles below the dropping zone in a heated collection zone to form an initial agglomerate of a partially foamed ceramic material,
   c. heating said initial agglomerate at a temperature above the initial melting temperature of said composition and below the temperature of the dropping zone for a time sufficient to further bloat and coalesce the particles to form a foamed ceramic agglomerate, and
   d. cooling the foamed ceramic agglomerate.

* * * * *